United States Patent Office 3,819,682
Patented June 25, 1974

3,819,682
SULFENYLATED CYCLOALKYLPHENYL-
N-METHYLCARBAMATES
Gerhard Zumach, Cologne, Engelbert Kuhle, Bergisch-
Gladbach, and Wolfgang Behrenz and Ingeborg Ham-
mann, Cologne, Germany, assignors to Bayer Aktien-
gesellschaft, Leverkusen, Germany
No Drawing. Filed Jan. 12, 1972, Ser. No. 217,281
Claims priority, application Germany, Jan. 23, 1971,
P 21 03 199.2
Int. Cl. C07c 145/00
U.S. Cl. 260—479 C                       7 Claims

ABSTRACT OF THE DISCLOSURE

Sulfenylated cycloalkylphenyl-N-methylcarbamates of the general formula

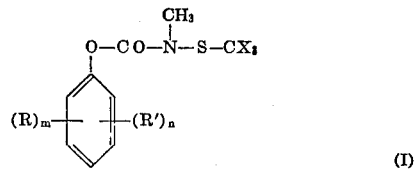

(I)

in which

R is cycloalkyl with 5 to 7 ring carbon atoms optionally substituted with 1 or 2 alkyl groups,
R' is lower alkyl or alkoxy, halogen or nitro,
X is fluorine, chlorine or bromine,
$m$ is 1, 2 or 3, and
$n$ is 0, 1 or 2, which possess insecticidal, acaricidal and fungicidal properties.

---

The present invention relates to and has for its objects the provision of particular new sulfenylated cycloalkyl-phenyl-N-methylcarbamates, i.e. (optionally alkyl-substituted - mono-, di or tri-cycloalkyl- optionally substituted-phenyl N - methyl - N - trihalomethylmercapto-carbamates, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, with other and further objects becoming apparent from a study of the within specification and accompanying examples.

It is known from German Published Specification No. 1,159,938 that 2-cyclopentylphenyl-N-methylcarbamate (Company A) exhibits insecticidal activity.

The present invention provides, as new compounds, the N-sulfenylated cycloalkylphenyl - N - methylcarbamates of the general formula

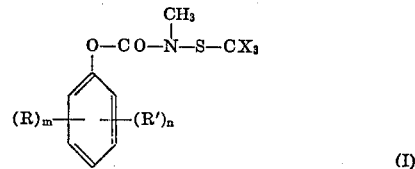

(I)

in which

R is cycloalkyl with 5 to 7 ring carbon atoms optionally substituted with 1 or 2 alkyl groups,
R' is lower alkyl or alkoxy, halogen or nitro,
X is fluorine, chlorine or bromine,
$m$ is 1, 2 or 3, and
$n$ is 0, 1 or 2.

These new compounds are distinguished by strong insecticidal, acaricidal and fungicidal properties.

The present invention also provides a process for the preparation of a sulfenylated cycloalkylphenyl-N-methyl-carbamate of the formula (I) above, in which an N-sulfenylated N-methyl-carbamic acid fluoride of the general formula

(II)

is reacted with a cycloalkylphenol of the general formula

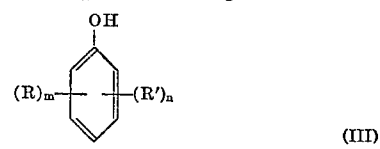

(III)

optionally in the presence of a diluent and optionally in the presence of an acid acceptor, in which formulas R, R', X, $m$ and $n$ have the meanings stated above.

It is decidedly surprising that the compounds according to the invention exhibit a higher insecticidal, acaricidal and fungicidal potency than the known 2-cyclopentylphenyl-N-methylcarbamate. The compounds according to the invention therefore represent an enrichment of the art.

If 2-cyclopentylphenol and N-(fluorodichloromethyl-thio)-N-methylcarbamic acid fluoride are used as starting materials, the reaction course can be represented by the following equation:

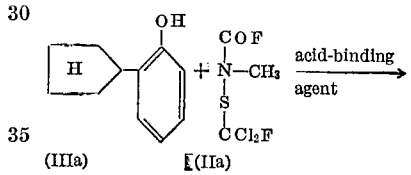

(IIIa)        [(IIa)

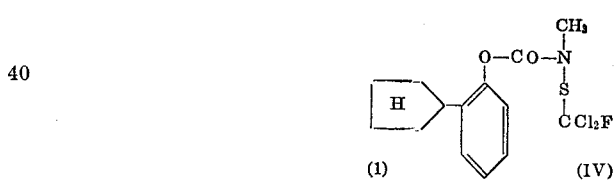

(1)        (IV)

The cycloalkylphenols to be used for the reaction are known and are defined by the formula (III). In this formula, as in formula (I), R is preferably cyclopentyl or cyclohexyl, either of which may be substituted by 1 or 2 lower alkyl groups, preferably containing 1 to 3 carbon atoms and especially methyl. R' is preferably nitro, chlorine, bromine, or lower alkyl with 1 to 3 and preferably 1 or 2 carbon atoms, especially methyl.

As examples of the phenols which can be used as starting materials, there may be mentioned:

2-cyclopentylphenol,
3-cyclopentylphenol,
4-cyclopentylphenol,
2-(2-methylcyclopentyl)-phenol,
2-(3-methylcyclopentyl)-phenol,
2-(2-ethylcyclopentyl)-phenol,
2-(3-ethylcyclopentyl)-phenol,
2-(2,3-dimethylcyclopentyl)-phenol,
2-(2,4-dimethylcyclopentyl)-phenol,
2-(2,5-dimethylcyclopentyl)-phenol,
2-cyclohexylphenol,
3-cyclohexylphenol,
4-cyclohexylphenol,
2-(2-methylcyclohexyl)-phenol,
2-(3-methylcyclohexyl)-phenol,
2-(4-methylcyclohexyl)-phenol,
2-cycloheptyl-phenol, 2-cyclopentyl-4-methylphenol,
2-cyclopentyl-5-methylphenol,
2-cyclopentyl-4,6-dimethylphenol,
3-cyclopentyl-4,6-dimethylphenol,
2,4-dicyclopentyl-5-methylphenol,
2,5-dicyclopentyl-4-methylphenol,
2,6-dicyclopentyl-4-methylphenol,
2,4,5-tricyclopentylphenol,
2-cyclohexyl-4-methylphenol,
2-cyclohexyl-5-methylphenol,
2-cyclohexyl-4,6-dimethylphenol,
3-cyclohexyl-4,6-dimethylphenol,
2,4-dicyclohexyl-5-methylphenol,
2,5-dicyclohexyl-4-methylphenol,
2,6-dicyclohexyl-4-methylphenol,
2,4,5-tricyclohexylphenol,
2-cyclopentyl-6-chlorophenol,
3-cyclopentyl-4-chlorophenol,
2-cyclohexyl-6-chlorophenol,
2-cyclohexyl-6-bromophenol,
3-cyclohexyl-4-chlorophenol,
2-cyclopentyl-4-nitrophenol,
2-cyclohexyl-4-nitrophenol, and the like.

The N-sulfenylated N-methylcarbamic acid fluorides to be used for the reaction are known and are defined by the formula (II). As shown in Belgian Patent Specification N. 717,705, they are obtainable from N-methylcarbamic acid fluoride and the appropriate sulfenyl chlorides, also described in the literature, in the presence of a tertiary amine.

Preparation of the compounds of this invention is effected preferably in the presence of a solvent or diluent. When working with solvents, those solvents are preferably used which do not react, or reach only very slowly, with the N-sulfenylated N-methylcarbamic acid fluorides. As such solvents, there may be mentioned, for example, optionally chlorinated hydrocarbons such as benzene, toluene, methylene chloride, dichloroethane, chloroform, chlorobenzene and dichlorobenzene; and ethers, such as diethyl ether, tetrahydrofurane and dioxane. Mixture of such solvents are also suitable.

To bind the hydrogen fluoride formed during the reaction, an acid acceptor, preferably a tertiary base such as triethylamine or an inorganic base such as an alkali metal hydroxide or an alkali metal carbonate, is added to the reaction mixture. It is also possible to start directly from the corresponding alkali metal phenolate and carry out the reaction in aqueous phase.

The reaction temperatures can be varied within a fairly wide range. In general, the work is carried out at from about 0° to 100° C., preferably at from 20° to 40° C.

Usually, the reactants are used in approximately equimolar amounts.

The active compounds according to the invention exhibit strong insecticidal and acaricidal properties with low phytotoxicity. The active compounds can therefore be used with good results for the control of noxious sucking and biting insects, Diptera and mites (Acarina). The compounds also exhibit a strong fungicidal activity, especially against soil borne and seed-borne fungal diseases of plants.

For these reasons, the compounds may be used in the crop-protection field, as well as in the hygiene field, as insecticides, acaricides and fungicides.

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the currant gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella) and the like.

Also to be classed with the biting insects contemplated herein are beetles (Coleoptera), for example the granary weevil (Sitophilus granarius=Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidus=Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the saw-toothed grain beetle (Oryzaephilus surinamensis), and also species living in the soil, for example wireworms (Agriotes spec.) and larvae of the cockchafer (Melolontha melolontha); cockroaches, such as the German cockroach (Blattella germanica), American cockroach (Periplaneta americana), Maderia cockroach (Leucophaea or Rhyparobia madeirae), oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the eastern subterranean termite (Reticulitermes flavipes) and Hymenoptera such as ants, for example the garden ant (Lasius niger); and the like.

The Diptera contemplated herein comprise essentially the flies, such as the vinegar fly (Drosophila melanogaster), the Mediterranean fruit fly (Ceratitis capitata), the house fly (Musca domestica), the little house fly (Fannia canicularis), the black blow fly (Phormia aegina) and bluebottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi); and the like.

With the mites (Acari) contemplated herein there are classed, in particular, the spider mites (Tetranychidae) such as the two-spotted spider mite (Tetranychus telarius=Tetranychus althaea or Tetranychus urticae) and the European red mite (Paratetranychus pilosus=Panonychus ulmi), gall mites, for example the black currant gall mite (Eriophyes ribis) and tarsonemids, for example the broad mite (Hemitarsonemus latus) and the cyclamen mite (Tarsonemus pallidus); finally, ticks, such as the relapsing fever tick (Ornithodorus moubata); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, and fungicides, or bactericides, nematocides, herbicides, rodenticides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and fungi, and more particularly methods of combating at least one of insects and acarids, which comprises applying to at least one of correspondingly (a) such insects, (b) such acarids, (c) such fungi, and (d) the corresponding habitat thereof, i.e. the locus to be protected, a correspondingly combative or toxic amount, i.e. an insecticidally, acaricidally or fungicidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforemnetioned concentration ranges.

The synthesis, unexpected superiority and outstanding activity of the particular new compounds of the present invention are illustrated, without limitation, by the following examples:

EXAMPLE 1

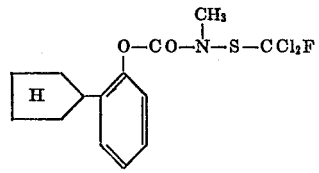

(1)

24 g. of 2-cyclopentylphenol (0.15 mole) and 31.5 g. of N-(fluorodichloromethylmercapto)-N-methyl-carbamic acid fluoride (0.15 mole) are dissolved in 200 ml. of dioxane. To this solution there are added dropwise, at room temperutare, 15 g. of triethylamine dissolved in 20 ml. of dioxane. After subsidence of the mildly exothermic reaction, stirring is effected for 1 hour at room temperature, then for 30 minutes at 50 to 60° C., followed by cooling; the reaction solution is then poured into 500 ml. of ice-water. The oil obtained is taken up in methylene chloride and washed with water. After drying of the solution and evaporation of the methylene chloride, there are obtained by distillation 31 g. of 2-cyclopentylphenyl N-methyl-N-dichlorofluoromethylmercapto-carbamate (1)

as a yellowish-colored oil; b.p. 151 to 153° C./0.15 mm. Hg.

Analysis.—Calc. (percent): C, 47.8; H, 4.6; Cl, 20.1; N, 4.0; S, 9.1. Found (percent): C, 47.6; H, 4.9; Cl, 19.7; N, 4.2; S, 9.2.

In an analogous manner to that described above, the following compounds are obtained

| (2) | ![structure] CH₃, O—CO—N—S—CCl₃, H-cyclopentyl-phenyl | B.P.: 192 to 195° C./0.4 mm. Hg. |
|---|---|---|
| (3) | CH₃, O—CO—N—S—CClF₂, H-cyclopentyl-phenyl | B.P.: 138 to 140° C./0.2 mm. Hg. |
| (4) | CH₃, O—CO—N—S—CF₃, H-cyclopentyl-phenyl | B.P.: 128 to 130° C./0.22 mm. Hg. |
| (5) | CH₃, O—CO—N—S—CCl₃, H-cyclohexyl-phenyl | Oil: $n_D^{20}$ 1.5526 |
| (6) | CH₃, O—CO—N—S—CClF₂, H-cyclohexyl-phenyl | B.P.: 153 to 155° C./0.21 mm. Hg. |
| (7) | CH₃, O—CO—N—S—CF₃, H-cyclohexyl-phenyl | B.P.: 138 to 140° C./0.22 mm. Hg. |

EXAMPLE 2

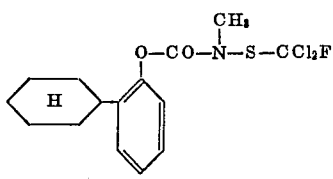

(8)

To a sodium-2-cyclohexylphenolate solution, which was prepared from 26 g. of 2-cyclohexylphenol (0.15 mole), 6 g. of sodium hydroxide and 300 ml. of water, there are added dropwise, at 10 to 15° C., 35 g. of N-(fluorodichloromethyl-mercapto)-N-methylcarbamic acid fluoride (0.165 mole) dissolved in 30 ml. of dioxane. Stirring is effected for 1 hour at room temperature, the oil formed is then taken up in methylene chloride, the organic phase is washed twice with water, and drying and evaporation are effected. The oil remaining behind is distilled in a high vacuum. 40 g. of 2-cyclohexyl-phenyl N-methyl-N-dichlorofluoromethylmercapto-carbamate (8) are obtained as a yellow oil; b.p.: 161 to 163° C./0.2 mm. Hg.

Analysis.—Calcd. (percent): C, 49.1; H, 4.9; Cl, 19.4; N, 3.8; S, 8.8. Found (percent): C, 48.1; H, 4.9; Cl, 19.7; N, 4.2; S, 9.2.

EXAMPLE 3

In an analogous manner to that described in Example 2, 2-cyclopentyl-4-methyl-phenyl N-methyl-N-dichlorofluoromethylmercapto-carbamate of the following formula is obtained:

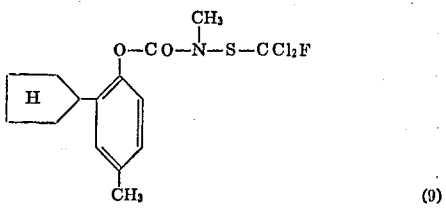

(9)

The pesticidal effectiveness of the compounds of the present invention is illustrated in and by the following Examples, in which the active compounds of this invention are identified by the numbers assigned to them in the foregoing preparative Examples.

EXAMPLE 4

LT₁₀₀ test for Diptera

Test animals: Musca domestica
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square centimeter of filter paper varies with the concentration of the solution of active compound used. About 25 test animals are then placed in the Petri dish and it is covered with a glass lid.

The condition of the test animals is continuously observed. The time which is necessary for a 100% knockdown effect is determined.

The test animals, the active compounds, the concentrations of the active compounds and the periods of time at which there is a 100% knock down effect can be seen from the following Table 1:

TABLE 1

$LT_{100}$ test for diptera

| Active compounds | Concentration of active compound of the solution in percent | $LT_{100}$ |
|---|---|---|
| (A) 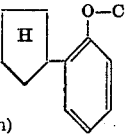 (known) | 1.0 | $6^h=85\%$ |
| (B) 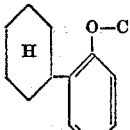 (known) | 1.0 | $8^h=0\%$ |
| (1) 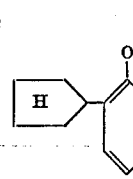 | 1.0<br>0.2<br>0.04 | 45'<br>75'<br>$6^h=80\%$ |
| (2) 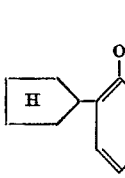 | 1.0<br>0.2 | 45'<br>$6^h=90\%$ |
| (3) 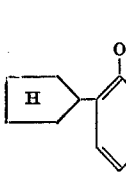 | 1.0<br>0.2<br>0.04 | 30'<br>30'<br>90' |
| (4) 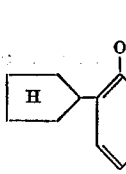 | 1.0<br>0.2<br>0.04<br>0.008 | 30'<br>30'<br>75'<br>180' |
| (6) 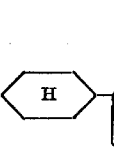 | 1.0<br>0.2<br>0.04 | 75'<br>$6^h$<br>$6=20\%$ |

TABLE 1—Continued

| Active compounds | Concentration of active compound of the solution in percent | $LT_{100}$ |
|---|---|---|
| (7) 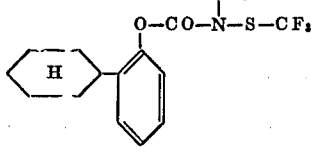 | 1.0<br>0.2<br>0.04 | 75'<br>105'<br>8ʰ |
| (9) 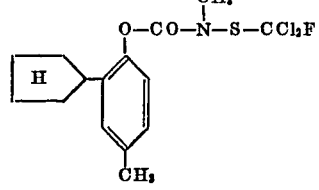 | 1.0<br>0.2 | 75'<br>6ʰ |

EXAMPLE 5

$LD_{100}$ test

Test animals: Triatoma infestans-3rd nymphal stage
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 15 test animals are then placed in the Petri dish and it is covered with a glass lid.

The condition of the test animals is observed 3 days after the commencement of the experiments. The destruction is determined as a percentage.

The active compounds, the concentrations of the active compounds and the results can be seen from the following Table 2:

TABLE 2
$LD_{100}$ test

| Active compounds | Concentration of active compound of the solution in percent | Destruction in percent |
|---|---|---|
| (A) 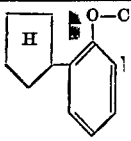<br>(known) | 1.0 | 80 |
| (B) 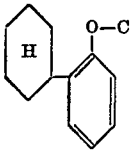<br>(known) | 1.0 | 0 |
| (1) 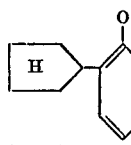 | 1.0<br>0.2<br>0.04 | 100<br>100<br>100 |
| (2) 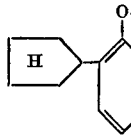 | 1.0<br>0.2<br>0.04 | 100<br>100<br>80 |

TABLE 2—Continued

| Active compounds | | Concentration of active compound of the solution in percent | Destruction in percent |
|---|---|---|---|
| (3) | 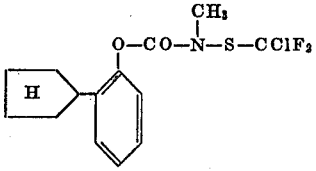 O—CO—N(CH₃)—S—CClF₂ | 1.0<br>0.2<br>0.04 | 100<br>100<br>60 |
| (4) | 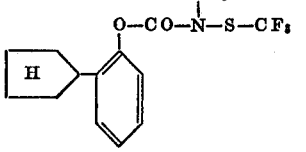 O—CO—N(CH₃)—S—CF₃ | 1.0<br>0.2<br>0.04 | 100<br>100<br>20 |
| (7) | 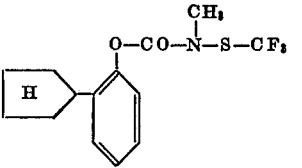 O—CO—N(CH₃)—S—CF₃ | 1.0<br>0.2 | 100<br>100 |

EXAMPLE 6

LD$_{100}$ test

Test animals: Tribolium confusum
Solvent: Acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 25 test animals are then placed in the Petri dish and it is covered with a glass lid.

The condition of the test animals is observed 3 days after the commencement of the experiments. The destruction is determined as a percentage.

The active compounds, the concentrations of the active compounds and the results can be seen from the following Table 3:

TABLE 3

LD$_{100}$ test

| Active compounds | | Concentration of active compound of the solution in percent | Destruction in percent |
|---|---|---|---|
| (A) | 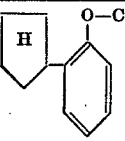 O—CO—NHCH₃<br>(known) | 1.0 | 40 |
| (B) | 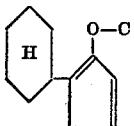 O—CO—NHCH₃<br>(known) | 1.0 | 0 |
| (1) | 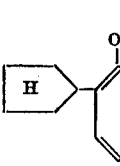 O—CO—N(CH₃)—S—CCl₂F | 1.0<br>0.2 | 100<br>90 |

TABLE 3—Continued

| Active compounds | | Concentration of active compound of the solution in percent | Destruction in percent |
|---|---|---|---|
| (3) | 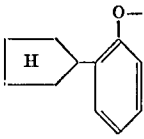 cyclohexyl-phenyl-O—CO—N(CH₃)—S—CClF₂ | 1.0<br>0.2<br>0.04 | 100<br>100<br>60 |
| (4) | 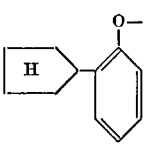 cyclohexyl-phenyl-O—CO—N(CH₃)—S—CF₃ | 1.0<br>0.2<br>0.04<br>0.008 | 100<br>100<br>100<br>10 |
| (6) | 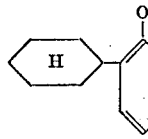 cyclohexyl-phenyl-O—CO—N(CH₃)—S—CClF₂ | 1.0<br>0.2<br>0.04 | 100<br>100<br>20 |
| (7) | 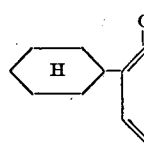 cyclohexyl-phenyl-O—CO—N(CH₃)—S—CF₃ | 1.0<br>0.2<br>0.04 | 100<br>100<br>50 |

EXAMPLE 7

Mosquito larvae test

Test insects: *Aedes aegypti* (4th larval stage)
Solvent: 99 parts by weight acetone
Emulsifier: 1 part by weight benzylhydroxydiphenyl polyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test animals and the results can be seen from Table 4:

TABLE 4
Mosquito larvae test

| Active compound | | Concentration of active compound of the solution in percent | Degree of destruction in percent |
|---|---|---|---|
| (A) | 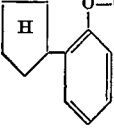 cyclohexyl-phenyl-O—CO—NHCH₃ (known) | 10<br>1 | 100<br>0 |
| (B) | 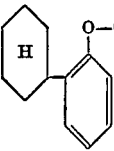 cyclohexyl-phenyl-O—CO—NHCH₃ (known) | 10 | 0 |
| (1) | 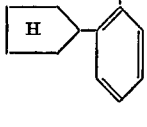 cyclohexyl-phenyl-O—CO—N(CH₃)—S—CCl₂F | 10<br>1<br>0.1 | 100<br>100<br>30 |

TABLE 4—Continued

| Active compound | Concentration of active compound of the solution in percent | Degree of destruction in percent |
|---|---|---|
| (3) 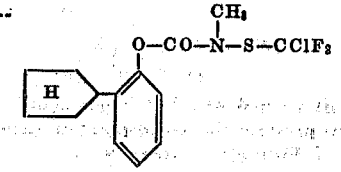 | 10<br>1 | 100<br>100 |
| (6) 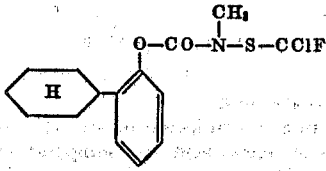 | 10<br>1 | 100<br>100 |

EXAMPLE 8

LD$_{100}$ test

Test animals: Ornithodoros moubata (relapsing fever tick) 3rd nymphal stage
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 15 test animals are then placed in the Petri dish and it is covered with a glass lid.

The condition of the test animals is observed 3 days after the commencement of the experiments. The destruction is determined as a percentage.

The active compounds, the concentrations of the active compounds, the test animals and the results can be seen from the following Table 5:

TABLE 5
LD$_{100}$ test

| Active compounds | Concentration of active compound of the solution in percent | Destruction in percent |
|---|---|---|
| (A) 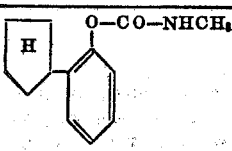<br>(known) | 1.0<br>0.2<br>0.04 | 100<br>100<br>80 |
| (B) 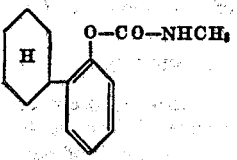<br>(known) | 1.0 | 80 |
| (3) 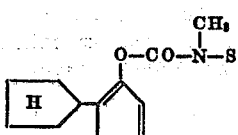 | 1.0<br>0.2<br>0.04<br>0.008 | 100<br>100<br>100<br>80 |
| (4) 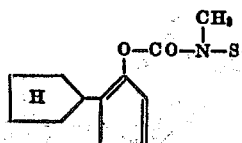 | 1.0<br>0.2<br>0.04<br>0.008 | 100<br>100<br>100<br>80 |

TABLE 5—Continued

| Active compounds | Concentration of active compound of the solution in percent | Destruction in percent |
|---|---|---|
| (6) 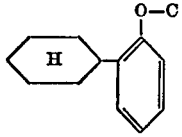 | 1.0<br>0.2<br>0.04<br>0.008 | 100<br>100<br>100<br>80 |

EXAMPLE 9

Myzus test (contact action)

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 6.

TABLE 6
Myzus test

| Active compounds | Concentration of active compound of the solution in percent | Degree of destruction in percent after 1 day |
|---|---|---|
| (A) 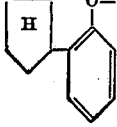<br>(known) | 0.2<br>0.02<br>0.002 | 98<br>40<br>0 |
| (B) 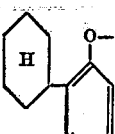<br>(known) | 0.2 | 0 |
| (4) 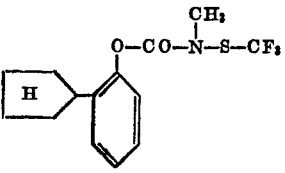 | 0.2<br>0.02 | 100<br>98 |
| (3) 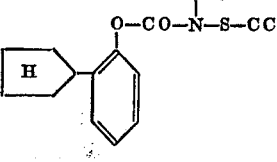 | 0.2<br>0.02 | 100<br>75 |
| (1) 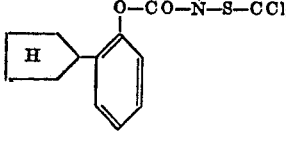 | 0.2<br>0.02<br>0.002 | 100<br>100<br>40 |

TABLE 6—Continued

| Active compounds | | Concentration of active compound of the solution in percent | Degree of destruction in percent after 1 day |
|---|---|---|---|
| (2) | 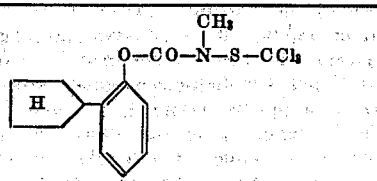 O—CO—N(CH₃)—S—CCl₃ | 0.2<br>0.02 | 100<br>95 |
| (7) | O—CO—N(CH₃)—S—CF₃ | 0.2<br>0.02 | 100<br>45 |
| (6) | O—CO—N(CH₃)—S—CClF₂ | 0.2<br>0.02 | 80<br>45 |
| (5) | O—CO—N(CH₃)—S—CCl₃ | 0.2 | 80 |

EXAMPLE 10

Tetranychus test/resistant

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 7:

TABLE 7
Tetranychus test/resistant

| Active compounds | | Concentration of active compound in percent | Degree of destruction after 2 days |
|---|---|---|---|
| (A) | O—CO—NHCH₃ (known) | 0.2 | 0 |
| (B) | O—CO—NHCH₃ (known) | 0.2 | 0 |

TABLE 7—Continued

| Active compounds | Concentration of active compound in percent | Degree of destruction after 2 days |
|---|---|---|
| (4) biphenyl-O—CO—N(CH$_3$)—S—CF$_3$ | 0.2 / 0.02 | 100 / 30 |
| (3) biphenyl-O—CO—N(CH$_3$)—S—CClF$_2$ | 0.2 / 0.02 | 100 / 40 |
| (1) biphenyl-O—CO—N(CH$_3$)—S—CCl$_2$F | 0.2 / 0.02 | 100 / 99 |
| (2) biphenyl-O—CO—N(CH$_3$)—S—CCl$_3$ | 0.2 | 95 |
| (5) cyclohexyl-phenyl-O—CO—N(CH$_3$)—S—CCl$_2$F | 0.2 / 0.02 | 100 / 55 |
| (6) cyclohexyl-phenyl-O—CO—N(CH$_3$)—S—CClF$_2$ | 0.2 | 100 |
| (7) biphenyl-O—CO—N(CH$_3$)—S—CF$_3$ | 0.2 | 100 |

EXAMPLE 11

Mycelium growth test

Nutrient medium used:
 20 parts by weight agar-agar
 200 parts by weight potato decoction
 5 parts by weight malt
 15 parts by weight dextrose
 5 parts by weight peptome
 2 parts by weight Na$_2$HPO$_4$
 0.3 parts by weight Ca(NO$_3$)$_2$
Proportion of solvent mixture to nutrient medium:
 2 parts by weight solvent mixture
 100 parts by weight agar nutrient medium
Composition of solvent mixture:
 0.19 parts by weight dimethyl formamide
 0.01 parts by weight emulsifier (benzylhydroxydiphenylpolyglycol ether)
 1.80 parts by weight water The amount of active compound required for the desired concentration of active compound in the nutrient medium is mixed with the stated amount of the solvent mixture. The concentrate is thoroughly mixed in the stated proportion with the liquid nutrient medium which has been cooled to 42° C. and is then poured into Petri dishes of 9 cm. diameter. Control dishes to which the preparation has not been added are also set up.

When the nutrient medium has cooled and solidified, the dishes are inoculated with the species of fungi stated in the Table and incubated at about 21° C.

Evaluation is carried out after 4-10 days, depending upon the speed of growth of the fungi. When evaluation is carried out the radial growth of the mycelium on the treated nutrient media is compared with the growth on the control nutrient medium. In the evaluation of the fungus growth, the following characteristic values are used:

0 no fungus growth
1 very strong inhibition of growth
2 medium inhibition of growth
3 slight inhibition of growth
4 growth equal to that of untreated control.

The active compounds, the concentrations of the active compounds and the results can be seen from the following Table 8:

It will be appreciated that the instant specification and examples are set forth by way of illustration and not limitation, and that various modifications and changes may be made without departing from the spirit and scope of the present invention.

What is claimed is:

1. N-sulfenylated cycloalkylphenylcarbamates of the general formula

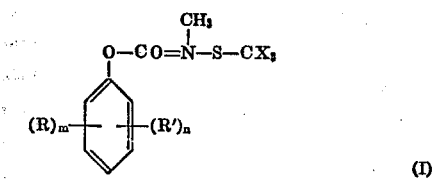

(I)

TABLE 8
Mycelium growth test

| Active compounds | Concentration of active compound, p.p.m. | Piricularia oryzae | Phialophora cinerescens | Pellicularia sasakii | Mycosphaerella musicola | Verticillium albo-atrum | Fusarium dianthi | Cochliobulus miyabeanus | Colletotrichum coffeanum | Xanthomonas oryzae |
|---|---|---|---|---|---|---|---|---|---|---|
| (C) cyclohexene-dicarboximide-N-S-CCl₃ (known) | 10 | 1 | 4 | 4 | 2 | 4 | 4 | 4 | 0 | 4 |
| (1) O-CO-N(CH₃)-S-CCl₂F, cyclohexyl-phenyl | 10 / 5 | 0 / 0 | | 1 / 1 | 0 / 0 | | | | 0 / 0 | |
| (3) O-CO-N(CH₃)-S-CClF₂, cyclohexyl-phenyl | 10 / 5 | 0 / 0 | | 1 / 2 | 0 / 0 | | | 2 / 3 | 0 / 0 | |
| (4) O-CO-N(CH₃)-S-CF₃, cyclohexyl-phenyl | 10 / 5 | 0 / 0 | 0 / 0 | 0 / 0 | 0 / 0 | 0 / 2 | 0 / 2 | 0 / 0 | 0 / 0 | 0 / 2 |
| (6) O-CO-N(CH₃)-S-CClF₂, cyclohexyl-phenyl | 10 / 5 | 0 / 0 | | 1 / 2 | 0 / 0 | | | | 0 / 0 | |
| (7) O-CO-N(CH₃)-S-CF₃, cyclohexyl-phenyl | 10 / 5 | 0 / 0 | | 1 / 2 | 0 / 0 | | | 2 | 0 / 0 | | in which
R is cyclopentyl or cyclohexyl optionally substituted with 1 or 2 lower alkyl groups,
R' is lower alkyl, lower alkoxy, halogen or nitro,
X is fluorine, chlorine or bromine,
m is 1, 2 or 3, and
n is 0, 1 or 2.

2. Compounds according to claim 1, in which the, or each R may be substituted by 1 or 2 $C_1$–$C_3$ alkyl groups, and the or each R' is alkyl with 1 or 2 carbon atoms, nitro, chlorine or bromine.

3. The compound according to claim 1 wherein such compound is 2-cyclopentyl-phenyl N-methyl-N-dichlorofluoro methylmercapto-carbamate of the formula

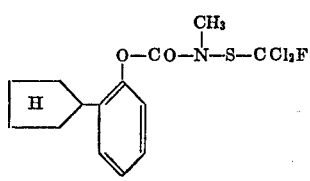

(1)

4. The compound according to claim 1 wherein such compound is 2-cyclopentyl-phenyl N-methyl-N-trichloromethylmercapto-carbamate of the formula

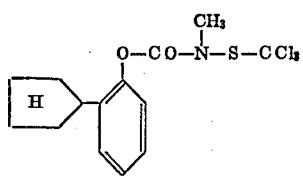

(2)

5. The compound according to claim 1 wherein such compound is 2-cyclopentyl-phenyl N-methyl-N-chlorodifluoromethylmercapto-carbamate of the formula

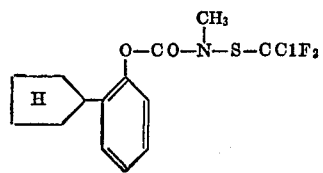

(3)

6. The compound according to claim 1 wherein such compound is 2-cyclopentyl-phenyl N-methyl-N-trifluoromethylmercapto-carbamate of the formula

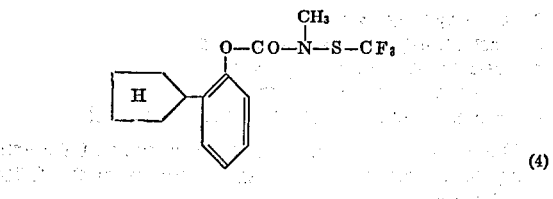

(4)

7. The compound according to claim 1 wherein such compound is 2-cyclohexyl-phenyl N-methyl-N-trifluoromethyl-mercapto-carbamate of the formula

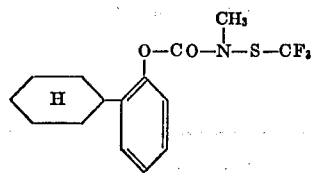

(7)

References Cited
FOREIGN PATENTS
1,493,581   7/1967   France.

OTHER REFERENCES
Fieser et al.: Organic Chem. (1956), 3rd ed., QD 251.F5.

JAMES A. PATTEN, Primary Examiner

U.S. Cl. X.R.
424—300

UNITED STATES PATENT OFFICE
CERTIFICATE OF CORRECTION

Patent No. 3,819,682                    Dated June 25, 1974

Inventor(s) GERHARD ZUMACH ET AL

It is certified that error appears in the above-identified patent and that said Letters Patent are hereby corrected as shown below:

Col. 1, line 53, cancel "Company" and substitute -- Compound --.

Col. 3, line 34, cancel "reach" and substitute -- react --.

Col. 5, line 70, change "0.001" to -- 0.0001 --.

Col. 6, line 5, change "0.001" to -- 0.0001 --;

Col. 6, line 66, correct spelling of "temperature".

Col. 25, in the Table, correct compound (1) to read as follows:

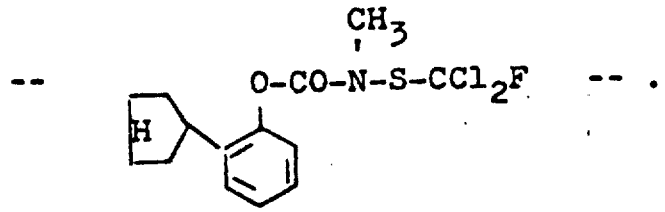

Col. 26, line 10, claim 1, in the formula, change double bond "=" to single bond -- - -- between CO and N.

Signed and sealed this 29th day of October 1974.

(SEAL)
Attest:

McCOY M. GIBSON JR.                     C. MARSHALL DANN
Attesting Officer                       Commissioner of Patents